United States Patent [19]

Connors et al.

[11] 3,859,521

[45] Jan. 7, 1975

[54] GRID LATERAL PHOTODETECTOR

[75] Inventors: William P. Connors, Florissant; Robert G. Wagner, University City; Jon C. Richmond, Cincinnati, all of Ohio

[73] Assignee: McDonnell Douglas Corporation,, St. Louis, Mo.

[22] Filed: Apr. 26, 1974

[21] Appl. No.: 464,690

Related U.S. Application Data

[63] Continuation-in-part of Ser. No. 326,114, Jan. 23, 1973, abandoned.

[52] U.S. Cl.....  250/211 J, 317/235 N, 317/235 UA
[51] Int. Cl............................................ H01j 39/12
[58] Field of Search............ 250/211 R, 211 J, 578, 250/203; 317/235 N, 235 UA

[56] References Cited
UNITED STATES PATENTS

| | | | |
|---|---|---|---|
| 3,210,548 | 10/1965 | Morrison | 250/211 J |
| 3,529,161 | 9/1970 | Oosthoek | 317/235 N |
| 3,622,844 | 11/1971 | Barelli | 317/235 UA |

*Primary Examiner*—Archie R. Borchelt
*Assistant Examiner*—D. C. Nelms
*Attorney, Agent, or Firm*—Charles B. Haverstock

[57] ABSTRACT

A semi-conductor radiation sensitive transducer capable of producing an electrical output signal which varies with the centroid position of radiation including non-uniform radiation incident on a surface thereof, the subject transducer includes means capable of absorbing light radiations impinging thereon and producing charge carrier pairs which are separated in a transducer region of a high electric field such as in the depletion region of a Schottky barrier or p-n junction, the majority of the carrier current resulting from the absorption being divided and distributed to an array or grid structure formed by multiple discrete ohmic contacts connected by a network of resistive elements and to associated collecting electrodes said collecting electrodes being operatively connected to signal processing circuitry.

17 Claims, 6 Drawing Figures

1 MM GRID SPACING

GRID LATERAL PHOTODETECTOR

This is a continuation-in-part of our earlier filed co-pending application Ser. No. 326,114, filed Jan. 23, 1973, now abandoned and assigned to the same assignee.

The subject transducer has significant advantages over other types of position sensitive radiation transducers and detectors. These advantages are realized in large measure because of the incorporation into the present construction of the array formed by spaced ohmic contacts and connected resistive connections on the back or rear surface of the subject semi-conductor transducer. The grid structure including the shape, spacing and resistance of the elements thereof may be individually controlled in the process of manufacturing the subject transducer to achieve certain desired characteristics and to tailor the device to a particular application. For example, by properly constructing the grid and selecting the resistor values and other parameters certain advantages are obtained over known lateral photodetector connstructions including those which make particular use of the resistance only of a bulk semi-conductor material to develop the lateral information. The advantages obtained by the present construction include greater flexibility in the operation of the subject device because the equivalent sheet resistance can be arbitrarily chosen and an ability to tailor the construction as aforesaid. If the equivalent sheet resistivity of the subject grid is selected to be relatively low better high frequency response characteristics are obtained while if the equivalent sheet resistivity is selected to be relatively high a better signal-to-noise relationship is obtained. Furthermore, the use of non-uniform grid resistor array as in the present construction provides means for achieving more desirable mapping of light spot position in relation to the output currents that are generated. Still further, the present construction has the advantage that the signal attenuation factor or fall-off with the distance where the light spot impinges relative to a particular collector electrode may be substantially reduced by a proper construction of the grid resistor network pattern. This latter feature is especially important to some applications because it makes it possible for the device to detect even relatively small responses with a greater degree of location accuracy and precision.

There are many known semi-conductive radiation sensitive transducers commercially available, but none of the known devices so far as Applicants are aware has the same desirable advantages as the present device, and none is structurally or operationally the same as the present device. The closest known prior art to the present invention is included in the following listed U.S. Letters Pat. Nos.

| | | | |
|---|---|---|---|
| 3,013,158 | McLellan | December | 12, 1961 |
| 3,207,902 | Sandborg | September | 31, 1965 |
| 3,246,161 | Mattare et al | April | 12, 1966 |
| 3,400,273 | Horton | September | 3, 1968 |
| 3,415,992 | Webb | December | 10, 1968 |
| 3,445,667 | Dillman | May | 20, 1969 |
| 3,529,161 | Oostoek et al | September | 15, 1970 |

None of the more important objects and advantages of the present construction are obtainable or present in any of the constructions disclosed in these patents.

It is therefore a principal object of the present invention to provide a semi-conductor radiation sensitive transducer capable of producing output electric signals which vary with the centroid position of the radiation including non-uniform radiation incident to the active surface of the device.

Another object is to provide a position sensitive radiation detector having an array formed by spaced ohmic contacts and connected resistive elements formed on the back or reverse side of a body of semi-conductor material.

Another object is to provide a radiation sensitive transducer having an array formed of grid resistors the resistances of which are established during their construction to achieve a particular desired operating condition.

Another object is to provide a grid lateral photodetector device that includes contacts interconnected by a grid array of resistance elements, the shape, size, spacing and resistance of which elements may be individually controlled during the fabrication process as desired.

Another object is to provide a transducer element in which the equivalent sheet resistance of certain portions can be arbitrarily chosen to provide flexibility in the performance of the device.

Another object is to provide a lateral photodetector that can be made to have different selectable performance characteristics depending upon the resistive and other characteristics of certain portions thereof, including the resistivity of an array of elements formed thereon.

Another object is to provide a grid lateral transducer having a non-uniform grid resistor array constructed to achieve particular operating characteristics such as a desired mapping of the position of a light spot which produces output currents in the device.

Another object is to minimize signal attenuation or fall-off as the distance from where a light spot impinges increases relative to the location of collector electrodes.

Another object is to provide the light responsive characteristics of a grid lateral transducer.

Another object is to provide a more flexible lateral photodetector device which can be made to have exceptionally high frequency response characteristics and exceptionally good signal-to-noise relationships.

Another object is to provide means to achieve certain desired current flow patterns in a semi-conductor detector device.

These and other objects and advantages of the present device will become apparent after considering the following detailed specification in conjunction with the accompanying drawing, wherein.

Figure 1:
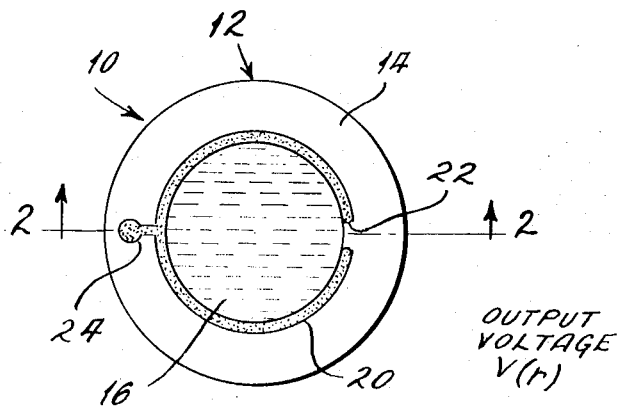
FIG. 1 is a front view of a transducer constructed according to one preferred form of the present invention.
Figure 2:
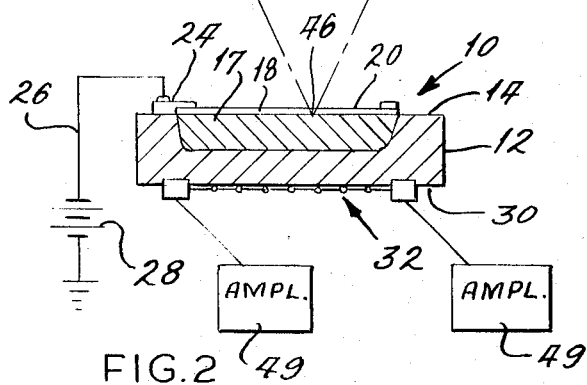
FIG. 2 is a cross-sectional view taken on line 2—2 of FIG. 1.
Figure 3:
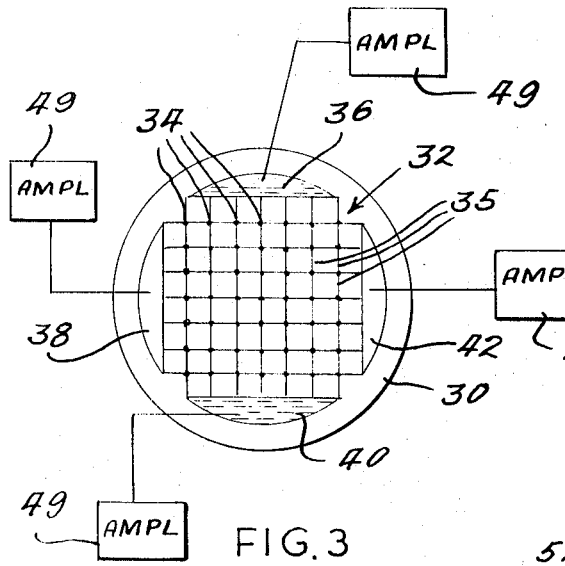
FIG. 3 is a bottom view of the same transducer.

Referring to the drawing more particularly by reference numbers, number 10 refers to a grid lateral photodetector or transducer constructed according to a preferred embodiment of the present invention. The transducer 10 has a semi-conductor body 12 having a front or forwardly facing surface 14. The body 12 is formed of a relatively high resistivity semi-conductor material, and the front surface also includes a centrally located region identified as the region 16. The region 16 in the construction shown in FIGS. 1–3 is formed as a Schottky barrier with a transparent or semi-transparent metal layer 18 deposited or otherwise attached to the body 12. When excited by light impinging thereon a depletion region 17 is formed in the device and this depletion region is a region characterized by having a relatively high electric field. The forward or front facing region 16 is the region defined by the semi-transparent metal layer 18 and this region and the barrier is surrounded or substantially circumscribed by an annular or nearly annular electrode 20. The break in the electrode 22 on one side is a convenience factor which results when the electrode is formed using masking and need not be included otherwise. The electrode 20 is also connected to an outwardly extending electrode portion 24 which is shown in FIG. 2 connected to a lead 26 that connects it to a source of D. C. potential such as to battery source 28. The opposite side of the D. C. source 28 is grounded.

The opposite or rear facing surface 30 of the semiconductor body 12 has a grid or grid array 32 formed thereon. The array 32 is formed by a plurality of spaced ohmic contacts 34 which are arranged in parallel rows and columns in the manner shown in FIG. 3. The contacts 34 are used as collection points to collect majority carriers released at the barrier when light impinges on the forwardly facing portion 16. The grid array or network 32 also includes grid resistor elements or connectors 35 which are connected between the various adjacent ohmic contacts 34 in the rows and columns in the manner shown. The resistance or resistivity of the elements or segments 35 of the grid resistor network 32 depends upon the manner of constructing the subject device and the materials selected. Typical material for use in constructing the grid elements 35 include nichrome and chromium although other materials are also possible and contemplated. The value of the resistance of the segments between each pair of adjacent connected ohmic contacts 34 is an important consideration to the invention because to a large extent this determines some of the more important distinguishing characteristics thereof. It is usually preferred, however, to have the equivalent impedance of the elements 35 lower than that of the semi-conductor material in the body 12 for reasons that will become apparent.

Also on the rearward surface of the subject transducer 10 are located four spaced quadrature collector electrodes identified as the electrodes 36, 38, 40 and 42. These collector electrodes are arranged in opposed pairs 36 and 40 and 38 and 42 and these pairs are located adjacent opposite sides of the rearward facing detector surface 30. Each of the collector electrodes is connected to the ends of the rows or columns of resistive elements 35 on one side of the grid resistor network or array 32 as clearly shown in FIG. 3. Since the detector 10 is shown as being round and wafer-like the collector electrodes are also shown as being chord shaped with their outer rounded edges spaced inwardly from the edge of the detector. It is anticipated, however, to construct detectors of the subject type in other than round shapes in which case some adjustment of the shapes of the parts will be made.

The subject device is operated by focusing radiation from a remote source and of an appropriate wavelength usually in the visible or near infra-red ranges into a spot on the forwardly facing surface 14 preferably in the area defined within the annular electrode 20. A light spot impinging in this region, which is a region of high dielectric field formed by the Schottky barrier depletion region 17, causes the release of hole-electron pairs some of which migrate to the depletion region and then to the grid structure 32. The thickness or transverse dimension of the depletion region 17 is controlled by the reverse bias voltage applied thereto from the source 28 through the electrode 24 and the associated transparent metal electrode 18 and the electrode 20. The photos of light absorbed in the Schottky barrier depletion region 17 contribute to the production of electric current due to the separation of electrons and holes. The majority carriers that are released flow toward the rear surface 30 of the semi-conductor body 12 where they collect at the various spaced ohmic contacts 34 causing current to flow in the various portions of the grid resistor network 32. In this way, currents are conducted through the grid to each of the four collector electrodes 36-42. This condition is obtained by assuming that the equivalent sheet resistance of the grid network 32 is much less than the sheet resistance of the bulk semiconductor material which is defined between the edge of the depletion region 17 and the back surface 30 of the subject detector. The equivalent sheet resistance in this region can be made to be quite large by increasing the reverse bias so that the semi-conductor depletion region 17 is fully depleted. The fractional currents conducted to each specific collector electrode 36–42 through the several resistive segments 35 connected thereto depend on the distance from where the incident light spot impinges on the subject detector to the said respective collector electrodes. This in turn depends on the number and spacing of the ohmic contacts 34 and on the resistance or impedance of the segments 35.

The subject device is designed to operate below the knee of the saturation current region of the semiconductor material used in the body 12. This is the region where increases in the bias voltage produce relatively small increases in current under conditions where no light is applied to the device. As the light intensity increases, however, there is a point when breakdown occurs which is the condition where the current avalanches and control is lost. This condition is sometimes called blooming and the present device should not be allowed to reach this condition.

Figure 4:
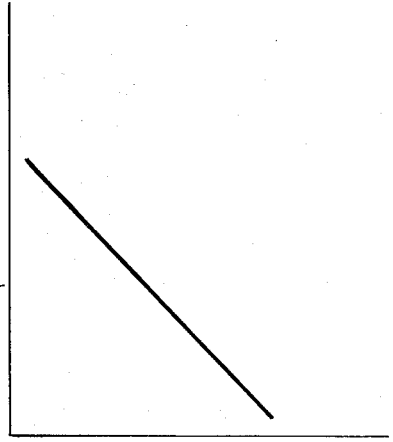
FIG. 4 is a graph of output voltage from the subject transducer plotted as a function of the position where a light spot impinges relative to an output electrode in millimeters.
Figure 5:
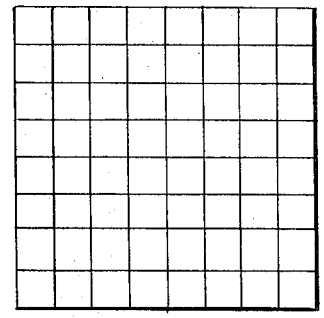
FIG. 5 is an enlarged view showing a grid layout in which the spacing between the grid elements are uniform in both directions; and, FIG. 6 is a cross-sectional view similar to FIG. 2 but showing a modified embodiment of the subject detector.

FIG. 4 shows a typical response curve obtained for the subject detector as a light spot transverses a straight line between two of the spaced opposed collector electrodes such as between the electrodes 36 and 40. By properly processing of the position sensitive signals a rectilinear plot such as shown in FIG. 5 is generated. This plot is obtained by combining the signals from the two opposed sets of spaced and opposed collector electrodes 36–42 thereby providing vertical and horizontal output information, as the light spot is scanned in a rectilinear grid pattern.

The spacing and resistance of the different segments 35 of the grid resistor array 32 are important within limits. The wider the spacing the more granularity occurs and the less effective or efficient is the grid. However, within practical limitations there does not appear to be a minimum dimensional spacing. Also, the array segments can be constructed in different ways such as by depositing materials having the desired characteristics using well known micro-electronic technology and various materials including those mentioned that can be used for the segments 35. The array 32 can also be formed or deposited using thin film vacuum deposition applications of thicker films, and it is contemplated to control the geometry of the pattern by means of masks or other well known devices and it is contemplated to use a photolithographic or similar processes to etch the grid structure on the semi-conductor body 12. The pattern can also be formed by controlling and deflecting a beam formed of ions or particles of a desired material as by the technique disclosed in Baker et al U.S. Letters Pat. No. 3,245,895 assigned to Applicants' assignee. Furthermore, the resistance of the individual grid members or segments 35 which extend between the adjacent ohmic contacts 34 can be adjusted by various means including varying the width or thickness of the grid elements, by applying multiple depositions on selected elements to change the resistance or impedance thereof and by varying the thickness and/or chemistry of the segment elements. In this way also certain inherent distortion characteristics associated with such devices may be compensated for.

The signal attenuation or fall-off parameter of the subject structure is largely dependent on the geometry of the grid resistor network 32 as well as on the shape of the collector electrodes and the manner in which they are connected to the grid array. The use of a grid resistor network therefore allows the fall-off parameter to be more easily and more accurately controlled. The present detector construction therefore provides means for producing output signals or responses that depend on and represent the position where a light spot impinges thereby making the device particularly suitable as a means for locating a light emitting object in a field of view for some purpose such as to follow the object, to guide or track the object, or some other purpose.

The subject device is also able to respond to radiations over a fairly wide range of frequencies including particularly, but not being limited to, radiations in the visible and near infra-red radiation bands. The incorporation of current collecting electrodes which are connnected to a grid-like array of discrete ohmic contacts on the surface of a semi-conductor body or wafer, which contacts are in turn connected by grid elements of a particular resistance or resistance characteristic also helps to control the current flow to the various collector electrodes and enables the device to be tailor-made to satisfy a particular condition. Furthermore, and importantly, selecting resistance values for the individual grid segments 35 gives to the device certain features which make it more accurate and precise. These include building in characteristics such as fall-off parameter characteristics, signal-to-noise ratios and frequency response characteristics. The spacing and resistance of the grid segments also affects the accuracy or precision of the device in locating an object, and the construction and operation of the grid structure can be made to compensate for distortion at a particular wavelength and in the rectilinear response of the device. This is made possible by eliminating the so-called "pin cushion" effect which in known detectors is usually due to electric field distortion and related problems. Still further, the construction and selection of the resistive grid network 32 and the selection of a suitable output amplifier stage or stages 49 associated therewith can be made to produce a desired pulse risetime as well as a desired fall-off parameter. As indicated, these depend in large measure on the selection and construction of the resistive grid network 32 including and network parameters discussed above.

The incident light 44 impinging on the subject detector at spot 46 impinges as already stated on the surface opposite from the grid network 32 usually after being focused thereon into the spot by means such as lens 48. The grid itself is not normally exposed to the incident light and this is desirable because the light is therefore not able to cause any distortion of the output which would otherwise result.

Figure 6:
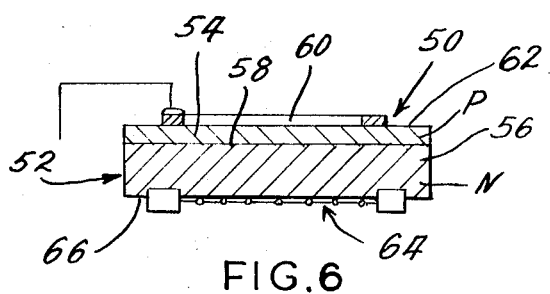

FIG. 6 shows a modified detector embodiment 50 which is similar in structure and operation to the device 10 but differs therefrom by having a p-n junction semiconductor wafer 53 instead of employing a Schottky barrier. A Schottky barrier, as it well known, is formed by applying a metal layer such as the transparent or semi-transparent metal layer 18 to the body of semiconductor material 12 as clearly shown in FIGS. 1 and 2. A p-n junction, on the other hand, does not require a metal layer by instead has its junction formed by and between different kinds of semi-conductor materials such as between a layer of p and a layer of n-type semiconductor materials. The p layer 54 and the n layer 56 are shown in FIG. 6 forming a junction at 58, and an annular electrode 60 is mounted on the forwardly facing surface 62 which is the surface to be exposed to incident radiation. A grid surface 64 (which may be of the same or similar construction as the grid structure 32) is mounted on or attached to the rear facing surface 66 of the semi-conductor body 52. Except for the face that the structure 50 is a p-n junction wafer structure instead of being a Schottky barrier device, it is similar to and produces substantially the same kinds of responses and outputs.

The performance characteristics of the subject detector are influenced by the values of the grid resistance elements and the selection of the value of the grid resistance elements, can be selected to produce certain desired characteristics as will be explained. The principal performance characteristics influenced by the selection of the grid resistance include (1) the fall-off parameter, and (2) the frequency response of the detector.

The fall-off parameter is a characterization of the rate at which a signal received at an electrode, such as at one of the electrodes 24, decreases with the distance between the location of the incident radiation and the electrode. The mechanism involves in this characteristic is a current divider action wherein the incident radiation can be represented by a current source, and the resistance from the incident radiation impingement position to a contact electrode plus the input resistance of the preamplifier from one of four parallel branches in which the current is divided. If the lateral resistance from the point where the incident radiation impinges to the contact is much smaller than the preamplifier resistance than there is little or no fall-off. However, when the detector resistance is much greater than the preamplifier resistance, the fall-off can be characterized substantially only by the detector parameters alone. This is a desirable situation, and as a general rule it can be said that for the best operation, the resistance measured between two opposing electrodes should be about 10 times the value of the preamplifier resistance.

The relationship between the interelectrode resistance and the grid resistor values, that is the resistance of the grid resistor elements 35, is a function of the electrode shapes, varying from an interelectrode resistance $R \approx 0$ 2 grid resistance ($2R$) for point electrodes to an interelectrode resistance $R \approx$ grid resistance $R$ when the length of each electrode is approximately one-fourth of the perimeter of the detector. In an actual embodiment of the subject construction, the preamplifier was constructed to have an input impedance of $\approx 80\Omega$. Also in the known construction, the length of the contacts was selected to be approximately one-fourth the perimeter of the detector and consequently the interelectrode resistance was $800\Omega$ and approximately equal to the grid resistances. This provided very good response characteristics although other variations are also possible and it is not intended to limit the subject construction to any particular dimension or resistance relationship. From this it can be seen, however, that it is important to establish a desirable fall-off parameter in order to achieve the most desirable operation situation.

The frequency response characteristic of the subject detector is determined by the grid resistance and also by the reverse bias capacitance of the detector. The risetime of the output signals is then proportional to the RC time constant. For a detector having a diameter of 1 centimeter and a depletion layer thickness of approximately 20 Mils, the time constant can be expressed as:

$$T = (800\Omega) \times (16\ pf) \approx 13\ ns$$

Aside from the average value of the grid resistors which is constrained by the considerations discussed above, variations in the grid resistor pattern can also affect the transfer characteristic between the input and output. With a uniform grid resistor array there is distortion when the radiation position is near one of the electrodes or along the outer regions of the diagonals. If the grid resistors in the outer regions along the diagonals are reduced by one-half the distortion free region can be increased by about 10 percent.

As indicated, the present device has many possible uses and applications including any use or application where it is desired to locate a light emitting object in a field of view for some purpose including for the purpose of tracking, guiding or directing the object or for some other related purpose including also maintaining an optical device optically oriented or centered on an object. Also, as already indicated the present device affords a valuable means for structuring or tailoring a light transducer or like structure to meet certain, often difficult or impossible to achieve, requirements.

Thus there has been shown and described a novel grid lateral detector or transducer device which fulfills all of the objects and advantages sought therefor. Many changes, modifications, variations and other uses and applications of the subject device are possible and are contemplated. All such changes, modifications, variations and other uses and applications which do not depart from the purpose and scope of the present invention are deemed to be covered thereby, the coverage being limited only by the claims which follow.

What is claimed is:

1. A radiation detector responsive to light radiations emitting from an object in a field of view comprising a semi-conductor element having first and second opposite surfaces, said first surface being oriented to receive radiations from the field of view, means forming a radiation sensitive region adjacent to said first surface including means forming a Schottky barrier, an associated depletion region on said semi-conductor element, a source of relatively static bias voltage and means connecting said source to the Schottky barrier forming means to bias said barrier electrode to a condition establishing a region of high electric field adjacent thereto in the semi-conductor element, means forming a grid on the said second surface of said semi-conductor element, said grid including a plurality of spaced ohmic contacts and means forming resistive electrical connections between adjacent ones of said ohmic contacts, a pair of spaced and opposed collector electrodes positioned on said second surface adjacent opposite sides of said grid, means connecting the collector electrodes to the resistive grid connections adjacent to the respective opposite sides of said grid, light impinging on the region formed by the Schottky barrier causing hole electron pairs to be released some of which migrate to the grid and generate currents in the resistive connections thereof, some of said current generated in the grid flowing to the collector electrodes to generate output signals thereat, the amount of current flow to each of said collector electrodes varying as a function of the distance between where radiations impinge on the first surface and the respective collector electrodes.

2. The detector defined in claim 1 wherein said ohmic contacts are arranged on said second surface in perpendicular rows and columns, said resistive grid connections extending between the adjacent ohmic contacts in the rows and columns to form a grid network, said pair of collector electrodes being positioned adjacent to and in electrical communication with opposite ends of said rows of ohmic contacts, and a second pair of spaced collector electrodes positioned adjacent to and in electrical communication with the opposite ends of said columns of ohmic contacts.

3. The detector defined in claim 1 wherein said Schottky barrier is formed by a layer of metal having light conducting properties positioned on the said first surface of said semi-conductor element.

4. The detector defined in claim 3 including a peripheral electrode positioned on said first surface and extending around the radiation sensitive region, said peripheral electrode being in electrical contact with the means forming the said Schottky barrier, and means connecting said peripheral electrode to said source of bias voltage.

5. The detector defined in claim 1 wherein said semiconductor element is a round wafer element.

6. The detector defined in claim 1 wherein the material used in the resistive connections of the grid has an equivalent sheet resistance that is substantially less than the equivalent sheet resistance of the semiconductor element.

7. The detector defined in claim 1 including means for focusing light received from a remote object in the field of view into a light spot on the said first element surface.

8. A detector device responsive to light radiations from a light emitting object in a field of view comprising a semi-conductor element having a body portion formed by adjacent layers of different semi-conductor materials, one of which is a layer of a p-type semi-conductor material and the other a layer of n-type semi-conductor material, said adjacent layers forming a p-n junction therebetween, said semi-conductor element having first and second opposite surfaces in the plane of the junction, said first surface being oriented to be exposed to light from the field of view, a bias electrode attached to said first surface and extending substantially around an area thereof, a source of voltage connected to said bias electrode to bias the adjacent semi-conductor element and the junction therein to a predetermined electrical potential, means forming a grid structure on the second surface of the semi-conductor element, said grid structure including a plurality of spaced ohmic contacts and means forming electrical resistive connections between adjacent ones of said ohmic contacts to form the grid structure, a pair of spaced collector electrodes positioned on said second surface adjacent to opposite sides of the grid structure, and means connecting respective ones of said collector electrodes to the grid structure adjacent to the respective opposite sides thereof so that currents generated in said ohmic contacts and resistive connections when light impinges on said first surface flow to and produce output signals at the said collector electrodes, the current flow to the respective collector electrodes being functionally related to the distance between where the light impinges on said first surface and the said respective electrodes.

9. The detector defined in claim 8 wherein said ohmic contacts are arranged on said second surface in angularly related rows and columns and said resistive connections extend between the adjacent ohmic contacts in the rows and columns to form the grid structure, said pair of collector electrodes being positioned adjacent to and in electrical communication with the grid resistive connections adjacent to opposite ends of the rows of ohmic contacts, and a second pair of spaced collector electrodes positioned adjacent to and in electrical communication with the grid resistive connections adjacent to opposite ends of said columns of ohmic contacts.

10. The detector device defined in claim 8 wherein the material used in the construction of the said resistive connections has an equivalent sheet impedance that is less than the equivalent sheet impedance of the semi-conductor materials in said element.

11. The detector device defined in claim 8 including means for focusing light received from a remote object in the field of view into a light spot on the said first surface of said semi-conductor element.

12. The detector device defined in claim 9 wherein said pairs of spaced collector electrodes are oriented across the said second surface of the semi-conductor elements at right angles to each other.

13. A light responsive lateral detector comprising a wafer-like body of semi-conductor material having spaced first and second opposite surfaces, means adjacent to the first body surface forming a barrier capable of releasing hole electron pairs when light is directed at said first body surface, means including an electrode on said first body surface and a source of potential connected to said electrode for predeterminately biasing said first surface including the barrier forming means into an operative condition which is a condition where increases in the intensity of light directed at the first surface produce corresponding increases in the number of released hole electron pairs, means on the second body surface in which currents are generated in response to the release of hole electron pairs, said last named means including a grid structure formed by spaced conductors positioned on said second surface, the equivalent sheet impedance of said material that form the spaced conductors being substantially less than the equivalent sheet impedance of the semi-conductor materials of said body, and spaced output collector electrodes on the second body surface adjacent opposite sides of the grid structure, each of said collector electrodes having electric connections to the said spaced grid conductors at the respective opposite sides of the grid structure, currents being generated in said conductors when light impinges on the body and releases hole electron pairs, the amount of current flow to each of said output electrodes being a function of the distance between where the light impinges on said body and the said respective output collector electrodes.

14. The detector defined in claim 13 wherein said body of semi-conductor material includes adjacent layers of different semi-conductor materials forming a junction therebetween.

15. The detector defined in claim 13 including a layer of a light conducting metal substance on said first body surface, said metal layer and said body forming a Schottky barrier.

16. The detector defined in claim 13 wherein said grid structure includes first and second sets of spaced conductors, the conductors of said first set being oriented at an angle relative to the conductors of said second set, and a pair of spaced output electrodes positioned adjacent opposite ends of the grid conductors of each set.

17. The detector defined in claim 16 including an ohmic contact positioned on the said second surface at the location where each conductor of the first set intersects each conductor of the second set to form a connection therebetween.

* * * * *